US010193985B2

(12) United States Patent
Park et al.

(10) Patent No.: US 10,193,985 B2
(45) Date of Patent: Jan. 29, 2019

(54) METHOD AND DEVICE FOR PERFORMING SERVICE DISCOVERY IN WIRELESS COMMUNICATION SYSTEM

(71) Applicant: LG ELECTRONICS INC., Seoul (KR)

(72) Inventors: Hyunhee Park, Seoul (KR); Byungjoo Lee, Seoul (KR); Dongcheol Kim, Seoul (KR); Giwon Park, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/557,379

(22) PCT Filed: Mar. 16, 2016

(86) PCT No.: PCT/KR2016/002647
§ 371 (c)(1),
(2) Date: Sep. 11, 2017

(87) PCT Pub. No.: WO2016/148506
PCT Pub. Date: Sep. 22, 2016

(65) Prior Publication Data
US 2018/0115618 A1    Apr. 26, 2018

Related U.S. Application Data

(60) Provisional application No. 62/133,481, filed on Mar. 16, 2015.

(51) Int. Cl.
*H04L 29/08* (2006.01)
*H04W 40/24* (2009.01)
(Continued)

(52) U.S. Cl.
CPC ............ *H04L 67/16* (2013.01); *H04W 40/24* (2013.01); *H04W 48/16* (2013.01); *H04W 84/18* (2013.01); *H04W 88/02* (2013.01); *H04W 84/12* (2013.01)

(58) Field of Classification Search
CPC ..... H04W 48/16; H04W 48/08; H04W 48/14; H04W 84/12; H04W 48/18; H04W 88/06;
(Continued)

(56) References Cited

U.S. PATENT DOCUMENTS 9,819,750 B2 * 11/2017 Raissinia ............. H04B 17/318
2011/0103264 A1    5/2011 Wentink
(Continued)

FOREIGN PATENT DOCUMENTS

WO     2014/185954 A1    11/2014

*Primary Examiner* — Magdi Elhag
(74) *Attorney, Agent, or Firm* — Dentons US LLP

(57) ABSTRACT

Provided according to the present invention is a method for a first neighbor awareness networking (NAN) device for performing service discovery in a wireless communication system. A method for performing service discovery comprises the steps of: exchanging a subscribe message with a second NAN device; and transmitting a first service discovery frame (SDF) on the basis of the exchanged subscribe message. The first service discover frame comprises a NAN connection capability attribute field, wherein the NAN connection capability attribute field comprises a first type interface information field, wherein the first type interface information field can show whether or not the first NAN device supports a first type interface.

15 Claims, 10 Drawing Sheets

(51) Int. Cl.
*H04W 84/18* (2009.01)
*H04W 88/02* (2009.01)
*H04W 48/16* (2009.01)
*H04W 84/12* (2009.01)

(58) Field of Classification Search
CPC ..... H04W 84/18; H04W 8/005; H04W 40/24; H04L 67/16; H04L 12/4633; H04L 12/66
See application file for complete search history.

(56) References Cited

U.S. PATENT DOCUMENTS

| | | | |
|---|---|---|---|
| 2012/0294294 A1 | 11/2012 | Zhang | |
| 2013/0044607 A1* | 2/2013 | Liu | H04W 8/26 370/242 |
| 2013/0227152 A1 | 8/2013 | Lee et al. | |
| 2014/0087778 A1 | 3/2014 | Kim et al. | |
| 2015/0098388 A1* | 4/2015 | Fang | H04W 48/16 370/328 |
| 2015/0124722 A1* | 5/2015 | Seok | H04W 74/04 370/329 |
| 2015/0131529 A1* | 5/2015 | Zhou | H04W 84/18 370/328 |
| 2015/0223047 A1* | 8/2015 | Abraham | H04W 52/0216 370/328 |
| 2015/0319029 A1* | 11/2015 | Abraham | H04W 4/008 370/310 |
| 2016/0057237 A1* | 2/2016 | Yang | H04L 67/16 709/224 |
| 2016/0127996 A1* | 5/2016 | Patil | H04W 48/16 370/311 |
| 2016/0135115 A1* | 5/2016 | Patil | H04W 48/16 370/338 |
| 2016/0366578 A1* | 12/2016 | Abraham | H04W 8/005 |
| 2017/0064612 A1* | 3/2017 | Bajko | H04W 48/08 |
| 2017/0223610 A1* | 8/2017 | Qi | H04W 48/10 |
| 2017/0289741 A1* | 10/2017 | Huang | H04W 48/12 |
| 2018/0041941 A1* | 2/2018 | Park | H04W 40/34 |
| 2018/0041946 A1* | 2/2018 | Park | H04W 48/16 |
| 2018/0049013 A1* | 2/2018 | Lee | H04W 8/005 |

* cited by examiner

METHOD AND DEVICE FOR PERFORMING SERVICE DISCOVERY IN WIRELESS COMMUNICATION SYSTEM

This application is a National Stage Application of International Application No. PCT/KR2016/002647, filed on Mar. 16, 2016, which claims the benefit of U.S. Provisional Application No. 62/133,481, filed on Mar. 16, 2015, all of which are hereby incorporated by reference in their entirety for all purposes as if fully set forth herein.

TECHNICAL FIELD

The present specification relates to a wireless communication system, and more particularly, to a method of performing service discovery in a wireless communication system and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

DISCLOSURE OF THE INVENTION

Technical Tasks

An object of the present specification is to provide a method of performing service discovery in a wireless communication system and an apparatus therefor.

Another object of the present specification is to provide a method for a NAN (neighbor awareness networking) device to share information on a different interface in a service discovery procedure in a wireless communication system.

The other object of the present specification is to provide a method for NAN devices to include information on a different interface in a frame exchanged in a service discovery procedure.

Technical Solution

To achieve these and other advantages and in accordance with the purpose of the present invention, as embodied and broadly described, according to one embodiment, a method of performing service discovery, which is performed by a first NAN (neighbor awareness networking) device in a wireless communication system, includes the steps of exchanging a subscribe message with a second NAN device and transmitting a first service discovery frame (SDF) based on the exchanged subscribe message. In this case, the first service discovery frame includes a NAN connection capability attribute field, the NAN connection capability attribute field includes a first type interface information field, and the first type interface information field can indicate whether or not the first NAN device supports a first type interface.

To further achieve these and other advantages and in accordance with the purpose of the present invention, according to a different embodiment, a first NAN (neighbor awareness networking) device performing service discovery in a wireless communication system includes a reception module configured to receive information from an external device, a transmission module configured to transmit information to an external device, and a processor configured to control the reception module and the transmission module, the processor configured to exchange a subscribe message with a second NAN device, the processor configured to transmit a first service discovery frame (SDF) based on the exchanged subscribe message. In this case, the first service discovery frame includes a NAN connection capability attribute field, the NAN connection capability attribute field includes a first type interface information field, and the first type interface information field can indicate whether or not the first NAN device supports a first type interface.

Following items can be commonly applied to the method of performing service discovery in a wireless communication system and the NAN device.

If the first type interface information field is set to a first value, the first NAN device supports the first type interface. If a second type interface information field is set to a second value, the first NAN device may not support the first type interface.

If the first type interface information field is set to the first value, the first service discovery frame can further include a first type interface attribute field.

The first type interface attribute field can include at least one selected from the group consisting of ID information on the first type interface, information supporting the first type interface, and information on an available channel and a time period.

The first type interface may correspond to an interface using a first frequency band.

The first frequency band may correspond to Sub 1 GHz band.

The method can further include the step of receiving a second service discovery frame from the second NAN device. In this case, the second service discovery frame can include information indicating whether or not the second NAN device supports the first type interface.

If the second NAN device supports the first type interface based on the second service discovery frame, data exchange can be performed with the second NAN device based on the first type interface.

Advantageous Effects

According to the present specification, it is able to provide a method of performing service discovery in a wireless communication system and an apparatus therefor.

According to the present specification, it is able to provide a method for a NAN (neighbor awareness networking) device to share information on a different interface in a service discovery procedure in a wireless communication system.

According to the present specification, it is able to provide a method for NAN devices to include information on a different interface in a frame exchanged in a service discovery procedure.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 8 is a diagram illustrating a discovery window and the like;

BEST MODE

Mode for Invention

Figure 1:
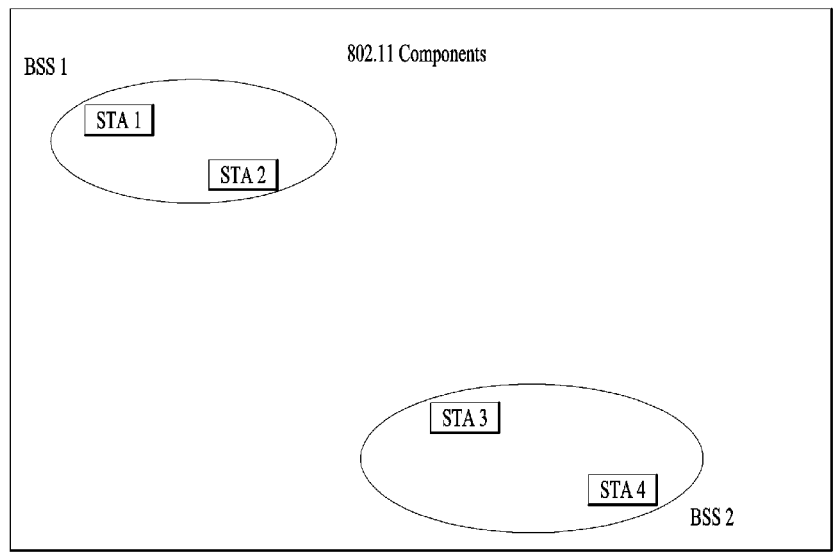
FIG. 1 is a diagram illustrating an exemplary structure of IEEE 802.11 system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

Structure of WLAN System

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the above-mentioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs instead of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME_GET/SET primitives through an MLME SAP (service access point). Furthermore, various PLME_GET/SET primitives may be exchanged between the PLME and the SME through PLME_SAP and may be exchanged between the MLME and the PLME through an MLME-PLME_SAP.

NAN (Neighbor Awareness Network) Topology

Figure 2:
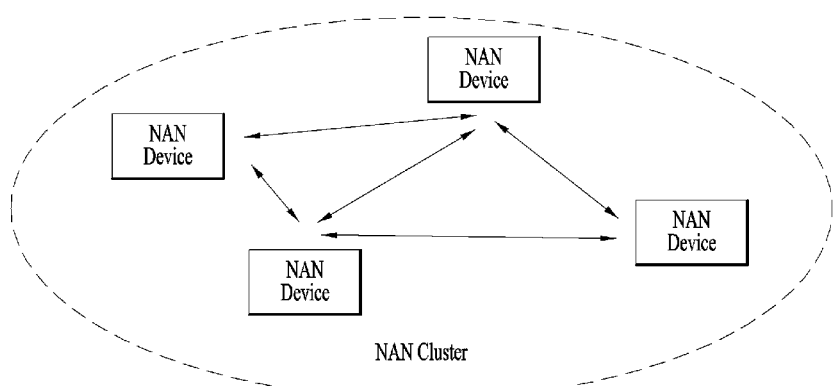
FIGS. 2 and 3 are diagrams illustrating examples of a NAN cluster.
Figure 3:
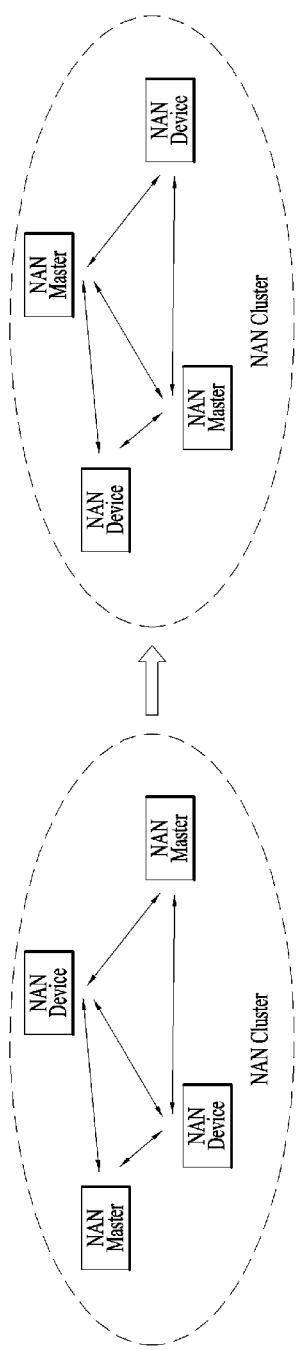

A NAN network can be constructed with NAN devices (devices) that use a set of identical NAN parameters (e.g., a time interval between consecutive discovery windows, an interval of a discovery window, a beacon interval, a NAN channel, etc.). A NAN cluster can be formed by NAN devices and the NAN cluster means a set of NAN devices that are synchronized on the same discovery window schedule. And, a set of the same NAN parameters is used in the NAN cluster. FIG. 2 illustrates an example of the NAN cluster. A NAN device included in the NAN cluster may directly transmit a multicast/unicast service discovery frame to a different NAN device within a range of the discovery window. As shown in FIG. 3, at least one NAN master may exist in a NAN cluster and the NAN master may be changed.

Moreover, the NAN master may transmit all of a synchronization beacon frame, discovery beacon frame and service discovery frame.

NAN Device Architecture

Figure 4:
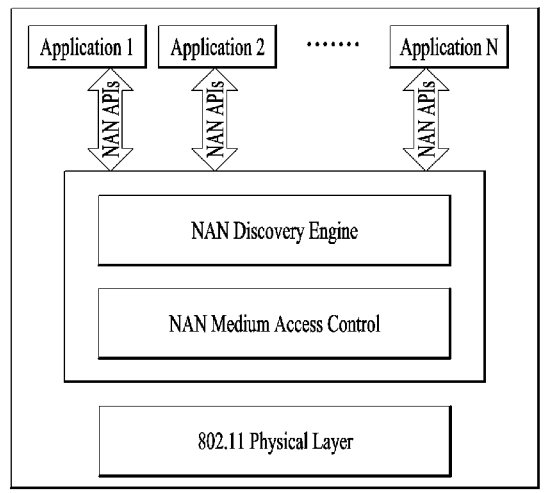
FIG. 4 illustrates an example of a structure of a NAN device.

FIG. 4 illustrates an example of a structure of a NAN device (device). Referring to FIG. 4, the NAN device is based on a physical layer in 802.11 and its main components correspond to a NAN discovery engine, a NAN MAC (medium access control), and NAN APIs connected to respective applications (e.g., Application 1, Application 2, . . . , Application N).

Figure 5:
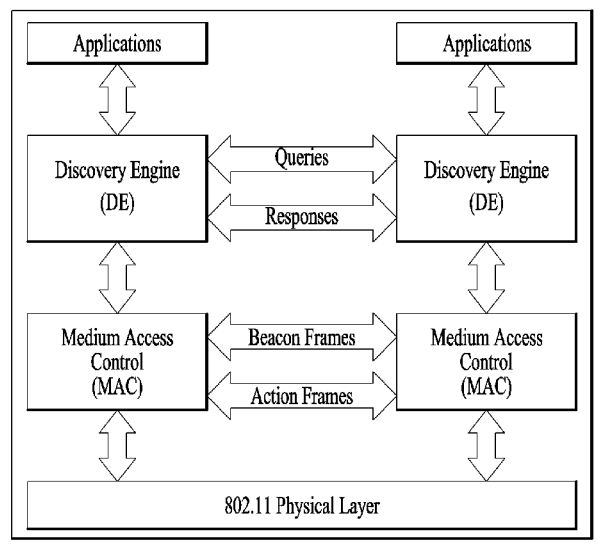
FIGS. 5 and 6 illustrate relations between NAN components.
Figure 6:
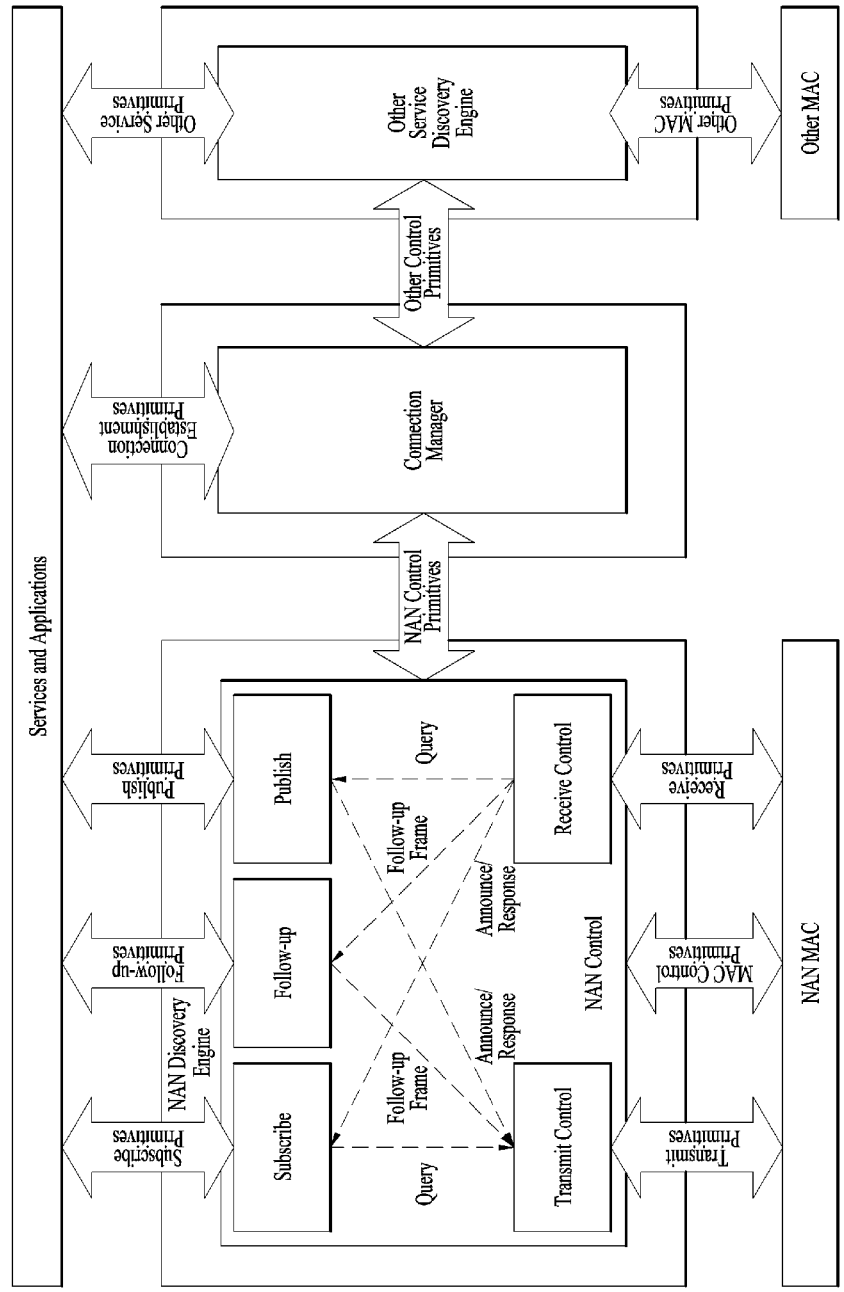

FIGS. 5 and 6 illustrate relations between NAN components. Service requests and responses are processed through the NAN discovery engine, and the NAN beacon frames and the service discovery frames are processed by the NAN MAC. The NAN discovery engine may provide functions of subscribing, publishing, and following-up. The publish/subscribe functions are operated by services/applications through a service interface. If the publish/subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN device

Figure 7:
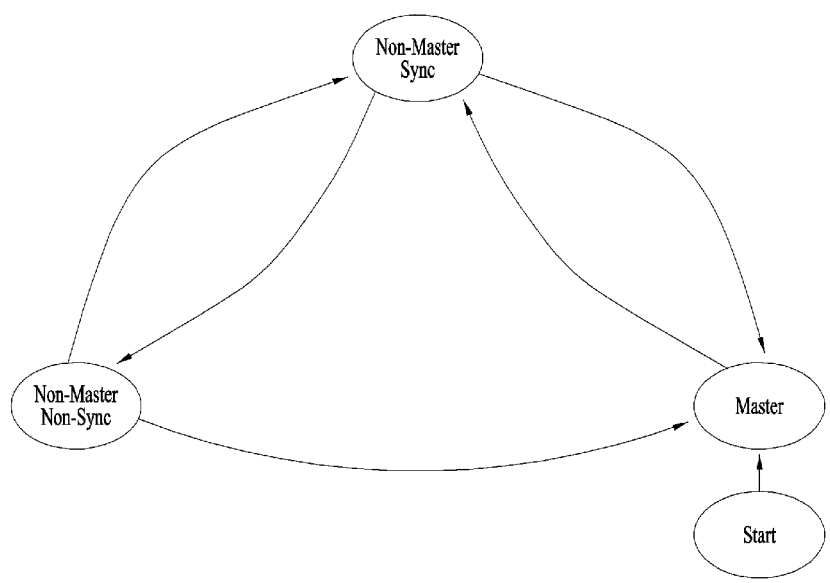
FIG. 7 is a diagram illustrating a state transition of a NAN device.

As mentioned in the foregoing description, a NAN device (device) can serve as a NAN master and the NAN master can be changed. In other words, roles and states of the NAN device can be shifted in various ways and related examples are illustrated in FIG. 7. The roles and states, which the NAN device can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1.

TABLE 1

| Role and State | Discovery Beacon | Synchronization Beacon |
| --- | --- | --- |
| Master | Transmission Possible | Transmission Possible |
| Non-Master Sync | Transmission Impossible | Transmission Possible |
| Non-Master Non-Sync | Transmission Impossible | Transmission Impossible |

The state of the NAN device can be determined according to a master rank (MR). The master rank indicates the preference of the NAN device to serve as the NAN master. In particular, a high master rank means strong preference for the NAN master. The NAN MR can be determined by Master Preference, Random Factor, Device MAC address, and the like according to Formula 1.

$$MasterRank = MasterPreference*2^{56} + RandomFactor*2^{48} + MAC[5]*2^{40} + \ldots + MAC[0] \quad \text{[Formula 1]}$$

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
| --- | --- | --- | --- |
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device's preference to serve as the role of Master, with a larger value indicating a higher preference. |
| Random Factor | 1 | 0-255 | A random number selected by the sending NAN Device. |

Regarding the above MR, in case of a NAN device that activates a NAN service and initiates a NAN cluster, each of the Master Preference and the Random Factor is set to 0 and NANWarmUp is reset. The NAN device should set a Master Preference field value in the master indication attribute to a value greater than 0 and a Random Factor value in the master indication attribute to a new value until when the NANWarmUp expires. When a NAN device joins a NAN cluster in which the Master Preference of an anchor master is set to a value greater than 0, the corresponding NAN device may set the Master Preference to a value greater than 0 and the Random Factor to a new value irrespective of expiration of the NANWarmUp.

Moreover, a NAN device can become an anchor master of a NAN cluster depending on an MR value. That is, all NAN devices have capabilities of operating as the anchor master. The anchor master means the device that has a highest MR and a smallest AMBTT (anchor master beacon transmit time) value and has a hop count (HC) (to the anchor master) set to 0 in the NAN cluster. In the NAN cluster, two anchor masters may exist temporarily but a single anchor master is a principle of the NAN cluster. If a NAN device becomes an anchor master of a currently existing NAN cluster, the NAN device adopts TSF used in the currently existing NAN cluster without any change.

The NAN device can become the anchor master in the following cases: if a new NAN cluster is initiated; if the master rank is changed (e.g., if an MR value of a different NAN device is changed or if an MR value of the anchor master is changed); or if a beacon frame of the current anchor master is not received any more. In addition, if the MR value of the different NAN device is changed or if the MR value of the anchor master is changed, the NAN device may lose the status of the anchor master. The anchor master can be determined according to an anchor master selection algorithm in the following description. In particular, the anchor master selection algorithm is the algorithm for determining which NAN device becomes the anchor master of the NAN cluster. And, when each NAN device joins the NAN cluster, the anchor master selection algorithm is driven.

If a NAN device initiates a new NAN cluster, the NAN device becomes the anchor master of the new NAN cluster. If a NAN synchronization beacon frame has a hop count in excess of a threshold, the NAN synchronization beacon frame is not used by NAN devices. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN device compares an anchor master rank value in the beacon frame with a stored anchor master rank value. If the stored anchor master rank value is greater than the anchor master value in the beacon frame, the NAN device discards the anchor master value in the beacon frame. If the stored anchor master value is less than the anchor master value in the beacon frame, the NAN device newly stores values greater by 1 than the anchor master rank and the hop count included in the beacon frame and an AMBTT value in the beacon frame. If the stored anchor master rank value is equal to the anchor master value in the beacon frame, the NAN device compares hop counters. Then, if a hop count value in the beacon frame is greater than a stored value, the NAN device discards the received beacon frame. If the hop count value in the beacon frame is equal to (the stored value—1) and if an AMBTT value is greater than the stored value, the NAN device newly stores the AMBTT value in the beacon frame. If the hop count value in the beacon frame is less than (the stored value—1), the NAN device increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN device exceeds the stored AMBTT value by more than 16*512 TUs (e.g., 16 DW periods), the NAN device may assume itself as an anchor master and then update an anchor master record. In addition, if any of MR related components (e.g., Master Preference, Random Factor, MAC Address, etc.) is changed, a NAN device not corresponding to the anchor master compares the changed MR with a stored value. If the changed MR of the NAN device is greater than the stored value, the corresponding NAN device may assume itself as the anchor master and then update the anchor master record.

Moreover, a NAN device may set anchor master fields of the cluster attributes in the NAN synchronization and discovery beacon frames to values in the anchor master record, except that the anchor master sets the AMBTT value to a TSF value of corresponding beacon transmission. The NAN device, which transmits the NAN synchronization beacon frame or the discovery beacon frame, may be confirmed that the TSF in the beacon frame is derived from the same anchor master included in the cluster attribute.

Moreover, a NAN device may adopt a TSF timer value in a NAN beacon received with the same cluster ID in the following case: i) if the NAN beacon indicates an anchor master rank higher than a value in an anchor master record of the NAN device; or ii) if the NAN beacon indicates an anchor master rank equal to the value in the anchor master record of the NAN device and if a hop count value and an AMBTT value in the NAN beacon frame are larger values in the anchor master record.

NAN Synchronization

NAN devices (devices) participating in the same NAN Cluster may be synchronized with respect to a common clock. A TSF in the NAN cluster can be implemented through a distributed algorithm that should be performed by all the NAN devices. Each of the NAN devices participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN devices may transmit synchronization beacon frames in order to help all NAN devices in the NAN cluster synchronize their own clocks.

NAN beacon transmission is distributed. A NAN beacon frame is transmitted during a DW period existing at every 512 TU. All NAN devices can participate in generation and transmission of the NAN beacon according to their roles and states. Each of the NAN devices should maintain its own TSF timer used for NAN beacon period timing. A NAN synchronization beacon interval can be established by the NAN device that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
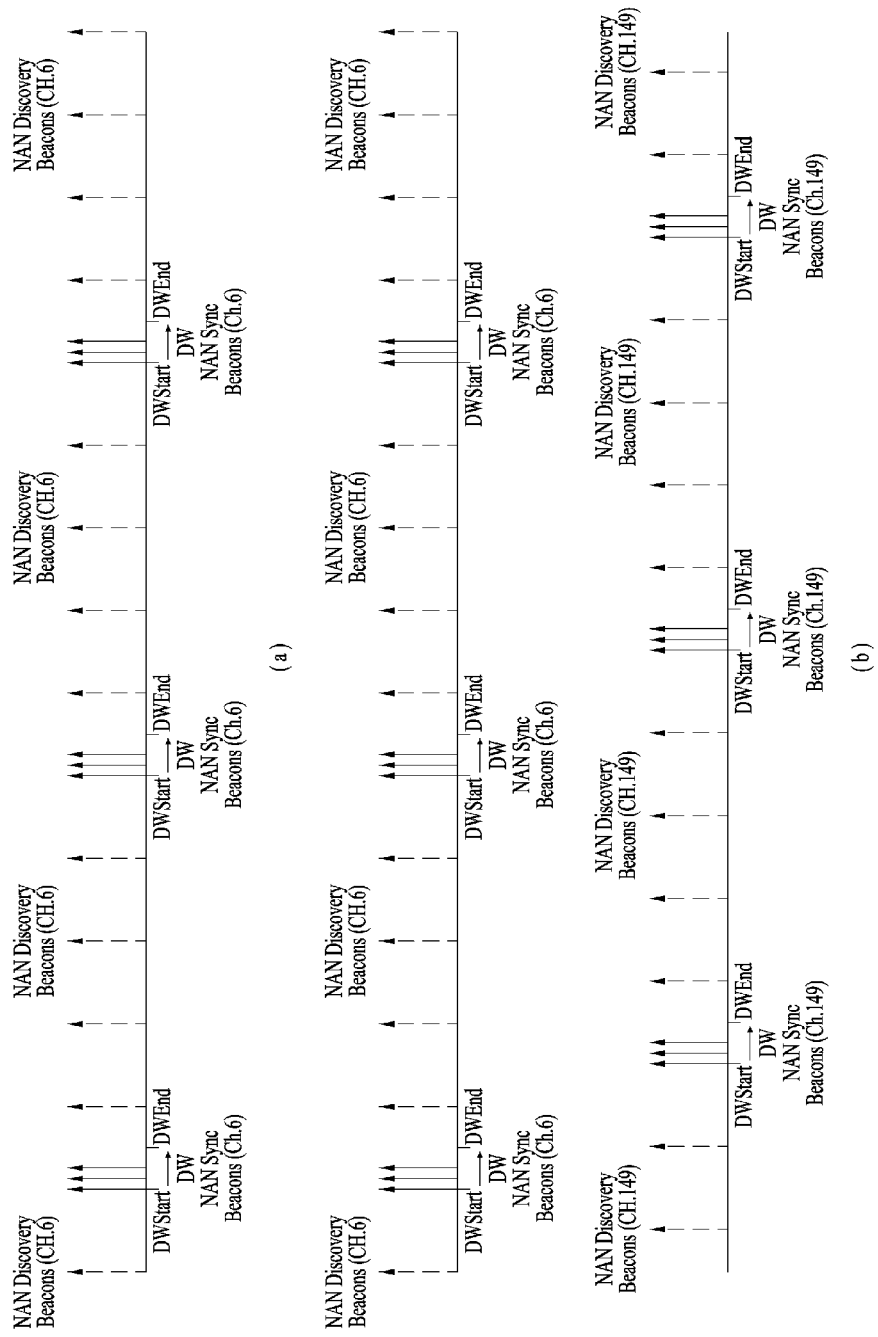

Each NAN device serving as a NAN master transmits a NAN discovery beacon frame from out of a NAN discovery window. On average, the NAN device serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN device participates, the NAN device serving as the NAN master is able to omit transmission of the NAN discovery beacon frame. In order to minimize power required to transmit the NAN discovery beacon frame, the NAN device serving as the NAN master may use AC_VO (WMM Access Category-Voice) contention setting. FIG. 8 illustrates relations between a discovery window and a NAN discovery beacon frame and transmission of NAN synchronization/discovery beacon frames. Particularly, FIG. 8 (*a*) shows transmission of NAN discovery and synchronization beacon frames of a NAN device operating in 2.4 GHz band. FIG. 8 (*b*) shows transmission of NAN discovery and synchronization beacon frames of a NAN device operating in 2.4 GHz and 5 GHz bands.

Figure 9:
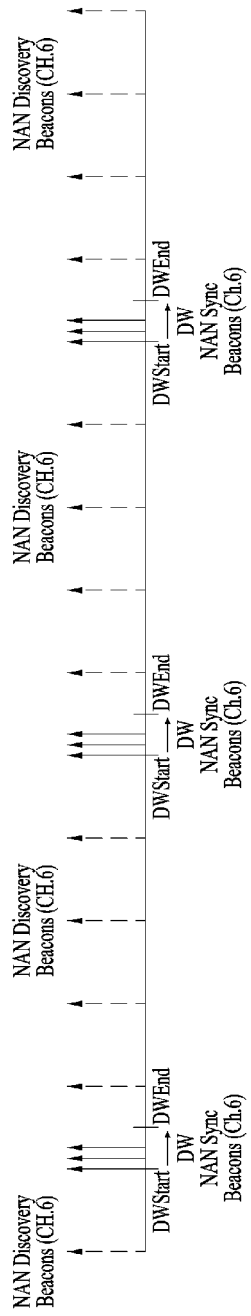
FIG. 9 is a diagram illustrating a discovery window.

FIG. 9 is a diagram illustrating a discovery window. As mentioned in the foregoing description, each NAN device performing a master role transmits a synchronization beacon frame within a discovery window and transmits a discovery beacon frame at the outside of the discovery window. In this case, as mentioned in the foregoing description, the discovery window can be repeated in every 512 TU. In this case, duration of the discovery window may correspond to 16 TUs. In particular, the discovery window can last during 16 TUs. In this case, for example, all NAN devices belonging to a NAN cluster may awake at every discovery window to receive a synchronization beacon frame from a master NAN device. By doing so, the NAN cluster can be maintained. In this case, if all NAN devices awake at every discovery window in a fixed manner, power consumption of the devices may get worse. Hence, it is necessary to have a method of reducing power consumption by dynamically controlling duration of a discovery window while synchronization is maintained in a NAN cluster.

For example, as mentioned in the foregoing description, a NAN device may operate in 2.4 GHz band or 5 GHz band. As a different example, a NAN device may operate in sub 1 GHz band. For example, a NAN device can be configured to support IEEE 802.11ah that supports sub 1 GHz band. For example, if a NAN device supports 900 MHz, it may have link quality and a physical model different from link quality and a physical model in 2.4 GHz or 5 GHz.

For example, if a NAN device supports 900 MHz, the NAN device can send a signal farther and perform communication in a wider range. In this case, data communication can be performed between NAN devices and data can be exchanged between NAN devices. In this case, since the data exchange is performed based on the data communication, a problem may exist in efficiently managing power in the NAN device. In order to solve the problem, it may differently configure a method of configuring a discovery window period. FIG. 9 shows a basic structure that a synchronization beacon frame is transmitted within a discovery window and a discovery beacon frame is transmitted at the outside of the discovery window. The basic structure can also be similarly applied to a NAN device supporting 900 MHz band.

Figure 10:
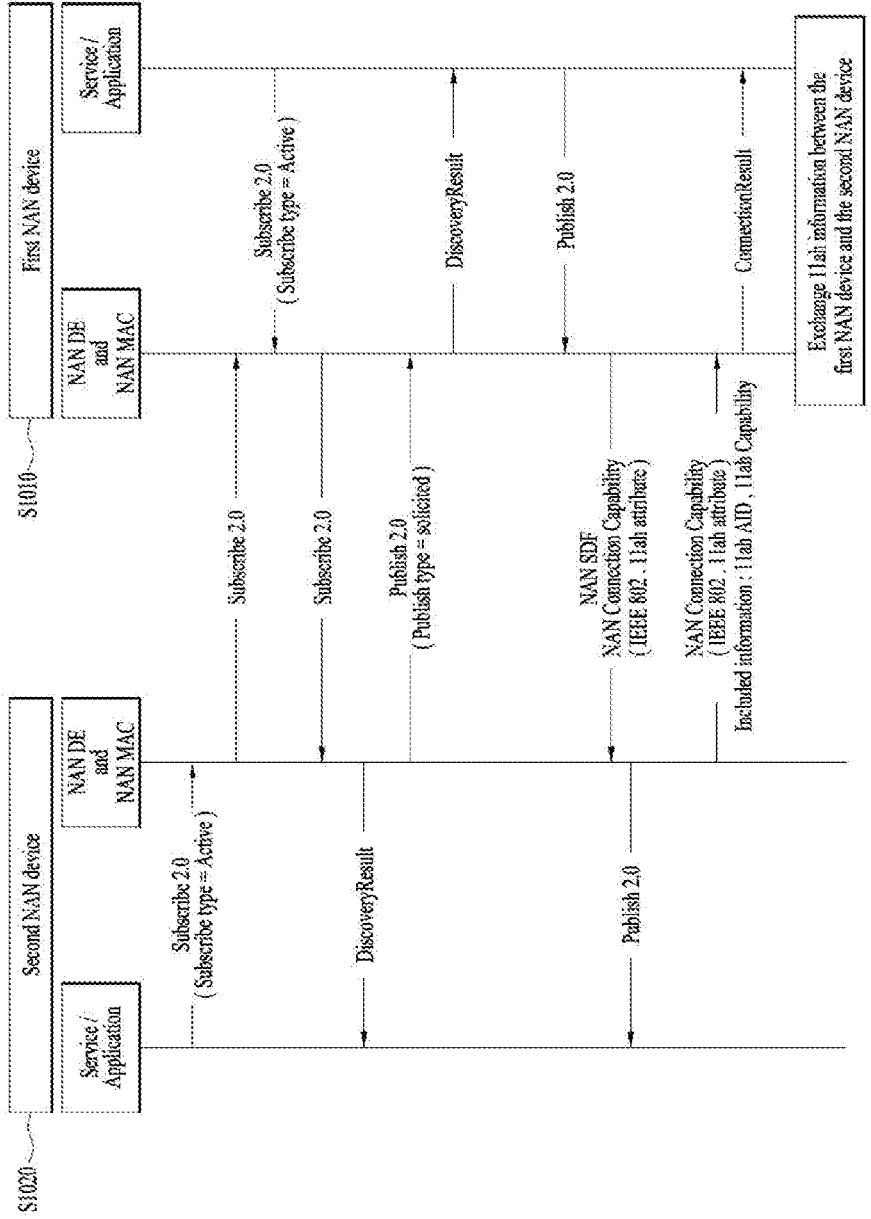
FIG. 10 is a diagram of a method for a NAN device to transmit a service discovery frame.

FIG. 10 is a diagram of a method for a NAN device to transmit a service discovery frame.

As mentioned in the foregoing description, NAN devices can support sub 1 GHz band or 900 MHz band to perform communication in a wider range. In this case, for example, it may be able to configure the NAN devices to support IEEE 802.11ah supporting sub 1 GHz band. In particular, it may be able to configure the NAN devices to support sub 1 GHz band or IEEE 802.11ah in a protocol used for discovery and synchronization. For configurations and contents related to IEEE 802.11ah, it may refer to IEEE 802.11ah standard document.

For example, as mentioned in the foregoing description, a NAN device can transmit a service discovery frame in a discovery window. In this case, the NAN device can discover a different NAN device capable of supporting a specific service via the service discovery frame. In this case, a frame format of the service discovery frame is shown in Table 3 in the following.

attribute fields can be differently defined to include different information according to a service discovery situation. The NAN device transmits the service discovery frame including information on discovery within a discovery window period to discover a NAN device supporting a specific service.

In this case, the NAN attribute fields can be configured based on Table 4 and Table 5 in the following. In particular, the NAN attribute fields can include different information according to an attribute ID of each of the NAN attribute fields. By doing so, it may be able to include necessary information in the service discovery frame.

TABLE 4

| Field | Size (Octets) | Value (Hex) | Description |
|---|---|---|---|
| Attribute ID | 1 | Variable | Identifies the type of NAN attribute as defined in Table 5-4 |
| Length | 2 | Variable | Length of the following fields in the attribute |
| Attribute Body Field | Variable | Variable | NAN Attribute specific information fields |

TABLE 3

| Field | Size (Octets) | Value (Hex) | Description |
|---|---|---|---|
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | Wi-Fi Alliance specific OUI |
| OUI Type | 1 | 0x13 | Identifying the type and version of the NAN |
| NAN Attributes | Variable | Variable | One or more NAN Attributes |

Referring to Table 3, the service discovery frame can include one or more NAN attribute fields and the NAN

TABLE 5

| Attribute | | NAN Beacon frames | | NAN |
|---|---|---|---|---|
| ID | Description | Synchronizaton | Discovery | SDF |
| 0 | Master Indication Attribute | YES/M | YES/M | NO |
| 1 | Cluster Attribute | YES/M | YES/M | NO |
| 2 | Service ID List Attribute | YES/O | YES/O | NO |
| 3 | Service Descriptor Attribute | NO | NO | YES/M |
| 4 | NAN Connection Capability Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13 | Cluster Discovery Attribute | NO | NO | NO |

TABLE 5-continued

| Attribute | | NAN Beacon frames | | NAN |
| --- | --- | --- | --- | --- |
| ID | Description | Synchronizaton | Discovery | SDF |
| 14-220 | Reserved | NA | NA | NA |
| 221 | Vendor Specific Attribute | YES/O | YES/O | YES/O |
| 222-255 | Reserved | NA | NA | NA |

For example, it may be able to additionally define an attribute field in the NAN attribute field as information for supporting sub 1 GHz band or IEEE 802.11ah.

In this case, a NAN connection capability attribute field of which an attribute ID of the NAN attribute field is set to 4 can be included in the service discovery frame.

In this case, information for supporting sub 1 GHz band or IEEE 802.11ah can be included in the NAN connection capability attribute field.

More specifically, referring to Table 6 and Table 7 in the following, the NAN connection capability attribute field can include a connection capability bitmap field. In this case, the connection capability bitmap field can include the information for supporting sub 1 GHz band or IEEE 802.11ah.

In this case, for example, among the bitmap field, a field defined by a bit of "6" can indicate whether or not sub 1 GHz band or IEEE 802.11ah is supported. For example, if a value of the field corresponds to a first value (a value set to 1 in the following table), it may indicate that a NAN device supports sub 1 GHz band or IEEE 802.11ah. On the contrary, if the value of the field corresponds to a second value (a value set to 0 in the following table), it may indicate that a NAN device does not support sub 1 GHz band or IEEE 802.11ah. In particular, a NAN device can indicate whether or not the NAN device supports sub 1 GHz band or IEEE 802.11ah using the information included in the connection capability bitmap field.

For example, as mentioned in the foregoing description, it may be able to define to use a single field only to indicate whether or not sub 1 GHz band or IEEE 802.11ah is supported for the backward compatibility with a legacy system, by which the present invention may be non-limited.

In particular, it may be able to add a field to the connection capability bitmap of the connection capability attribute field of the service discovery frame in consideration of the legacy system to indicate whether or not sub 1 GHz band or IEEE 802.11ah is supported.

TABLE 6

| Field | Size (octets) | Value | Description |
| --- | --- | --- | --- |
| Attribute ID | 1 | 0x04 | Identifies the type of NAN attribute. |
| Length | 2 | 2 | Length of the following fields in the attribute. |
| Connection Capability Bitmap | 2 | Variable | A set of parameters indicating NAN Device's connection capabilities, as defined in Table 2. |

TABLE 7

| Bit(s) | Information | Notes |
| --- | --- | --- |
| 0 | Wi-Fi Direct | The Wi-Fi Direct field shall be set to 1 if the NAN Device supports Wi-Fi Direct, and is set to 0 otherwise. |
| 1 | Wi-Fi Direct Services | The Wi-Fi Direct Services field shall be set to 1 if the NAN Device supports Wi-Fi Direct Services, and is set to 0 otherwise. |
| 2 | TDLS | The TDLS field shall be set to 1 when the NAN Device supports TDLS, and is set to 0 otherwise. |
| 3 | WLAN Infrastructure | The WLAN Infrastructure field shall be set to 1 when the NAN Device currently connect to an WLAN Infrastructure AP, and is set to 0 otherwise. |
| 4 | IBSS | The IBSS field shall be set to 1 when the NAN Device supports IBSS, and is set to 0 otherwise. |
| 5 | Mesh | The Mesh field shall be set to 1 when the NAN Device supports Mesh, and is set to 0 otherwise. |
| 6 | IEEE 802.11ah | IEEE 802.11ah field shall be set to 1 when the NAN2 Device supports IEEE 802.11ah, and is set to 0 otherwise. |
| 7-15 | Reserved | — |

For example, if the NAN connection capability bitmap indicates that sub 1 GHz band or IEEE 802.11ah is supported, the service discovery frame can include attribute information on sub 1 GHz band or IEEE 802.11ah. In particular, the attribute information on sub 1 GHz band or IEEE 802.11ah can be included as NAN attribute information included in the service discovery frame.

In this case, as shown in Table 8 in the following, it may indicate the attribute information on sub 1 GHz band or IEEE 802.11ah using one of reserved bits of the attribute ID shown in Table 5.

TABLE 8

| Attribute | | NAN Beacons | | NAN |
| --- | --- | --- | --- | --- |
| ID | Description | Sync | Discovery | SDF |
| 0 | Master Indication Attribute | YES/M | YES/M | NO |
| 1 | Cluster Attribute | YES/M | YES/M | NO |
| 2 | Service ID List Attribute | YES/O | YES/O | NO |

TABLE 8-continued

| Attribute | | NAN Beacons | | NAN |
| --- | --- | --- | --- | --- |
| ID | Description | Sync | Discovery | SDF |
| 3 | Service Descriptor Attribute | NO | NO | YES/M |
| 4 | NAN Connection Capability Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13 | Cluster Discovery Attribute | NO | NO | NO |
| 14 | IEEE 802.11ah Attribute | NO | NO | YES/O |
| 15-220 | Reserved | NA | NA | NA |
| 221 | Vendor Specific Attribute | YES/O | YES/O | YES/O |
| 222-255 | Reserved | NA | NA | NA |

If attribute information on sub 1 GHz band or IEEE 802.11ah is included in the service discovery frame, the attribute information on sub 1 GHz band or IEEE 802.11ah can be represented as Table 9 in the following.

More specifically, the attribute information on sub 1 GHz band or IEEE 802.11ah can include at least one field selected from the group consisting of an attribute ID field, a length field, a MAC address field, a map control field, an availability intervals bitmap field, an IEEE 802.11ah AID field, and an IEEE 802.11ah capability field.

In this case, if sub 1 GHz band or IEEE 802.11ah is supported, the IEEE 802.11ah AID field can include AID (association ID) information. In this case, for example, AID may correspond to information on an identifier capable of being allocated to a station when the station is associated with an AR In particular, when a device uses sub 1 GHz band or IEEE 802.11ah, AID information can be included as identification information on the NAN device. In this case, for example, when the NAN devices use sub 1 GHz band or IEEE 802.11ah, it is necessary to provide the AID information to the AP or a different NAN device as identification information. Hence, when sub 1 GHz band or IEEE 802.11ah is supported, the IEEE 802.11ah AID field can include the AID information in the attribute information on sub 1 GHz band or IEEE 802.11ah. By doing so, it may be able to indicate AID information on a NAN device that transmits the service discovery frame.

TABLE 9

| Field | Size (octets) | Value | Description |
| --- | --- | --- | --- |
| Attribute ID | 1 | 0x0E | Identifies the type of NAN2 attribute for IEEE 802.11ah. |
| Length | 2 | Variable | Length of the following fields in the attribute. |
| MAC Address | 6 | Variable | Device's IEEE 802.11ah interface address |
| Map Control | 1 | Variable | The availability channel and time map control information, as defined in Table 5. |
| Availability Intervals Bitmap | Variable | Variable | The Availability Intervals Bitmap divides the time between the beginnings of consecutive Discovery Windows of a given NAN cluster into consecutive time intervals of equal durations. The time interval duration is specified by the Availability Interval Duration subfield of the Map Control field. A NAN device that sets the i-th bit of the Availability Intervals Bitmap to 1 shall be present during the corresponding i-th time interval in the operation channel indicated by the associated Further Availability Map attribute. A NAN device that sets the i-th bit of the Availability Intervals Bitmap to 0 may be present during the corresponding i-th time interval in the operation channel indicated by the associated Further Availability Map attribute. |
| IEEE 802.11ah (Association Identifier) AID | Variable | Variable | Provides AID information on IEEE 802.11ah |
| IEEE 802.11ah Capability | Variable | Variable | Specifies capabilities necessary for supporting IEEE 802.11ah |

And, for example, among the aforementioned fields, the map control filed can be represented as Table 10 in the following. In this case, for example, the map control field can provide information on a time period for which sub 1 GHz band or IEEE 802.11ah is supported by a NAN device and information on a channel. More specifically, the NAN device can configure a time period and a channel capable of maintaining an awake state for sub 1 GHz band or IEEE 802.11ah based on a value indicated by the map control field and the availability intervals bitmap field. And, it may be able to check information on a channel available for sub 1 GHz band or IEEE 802.11ah based on a related further availability map attribute. In particular, information on a time period and a channel supporting sub 1 GHz band or IEEE 802.11ah by a NAN device can be provided by the map control field.

TABLE 10

| Bit(s) | Information | Notes |
|---|---|---|
| 0-3 | Map ID | Identifies the associated Further Availability Map attribute |
| 4-5 | Availability Interval Duration | Indicates the availability interval duration associated with the Availability Intervals Bitmap field. The value is set as follows: 0: 16 TU; 1: 32 TU; 2: 64 TU: 3: reserved |
| 6 | Repeat | 0: the signaled availability applies only to the time interval between the beginnings of two consecutive DWs, during which the corresponding attribute is received; 1: the signaled availability repeats for future intervals between DWs for 16 intervals, or until it is changed by a NAN Service Discovery frame that carries different availability information, whichever comes earlier. |
| 7 | Reserved | — |

For example, among the aforementioned fields, the IEEE 802.11ah capability field can be represented as Table 11 in the following. In this case, the IEEE 802.11ah capability field can include at least one selected from the group consisting of a length field, a short beacon frame field, a page index field, a page offset field, an encoded TIM bitmap field, and a supported data rates field. In particular, the IEEE 802.11ah capability field can include information necessary for a NAN device to use sub 1 GHz band or IEEE 802.11ah.

Figure 11:
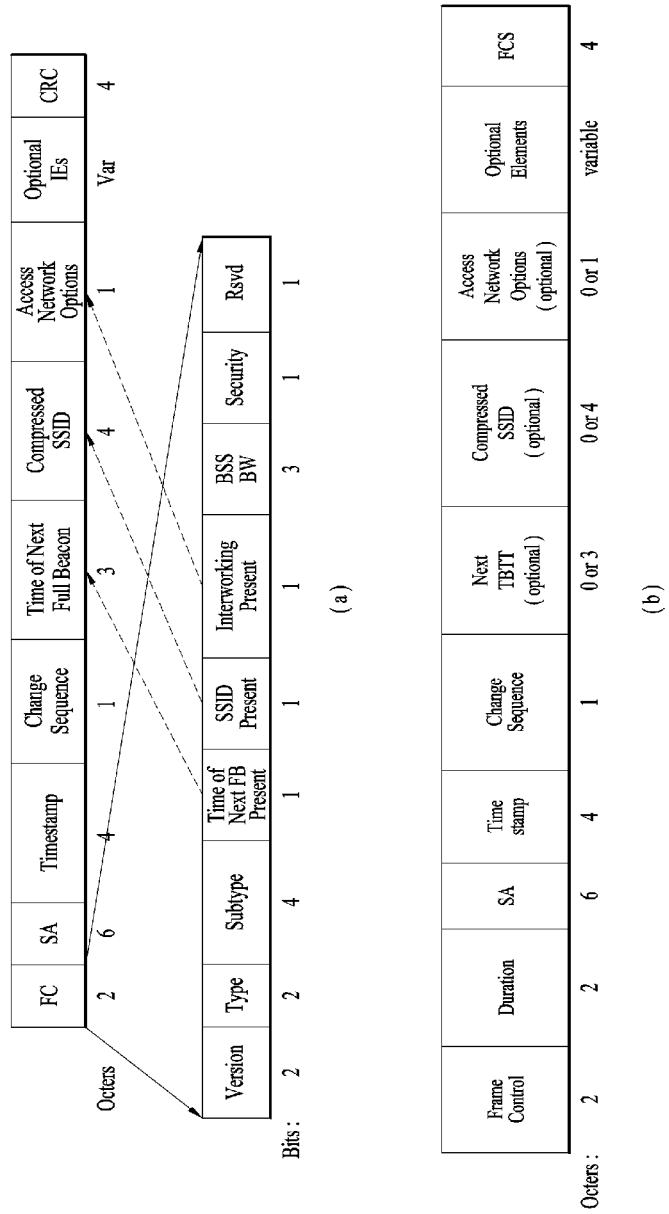
FIG. 11 is a diagram for a beacon frame or a short beacon frame.

In this case, for example, the short beacon frame field can include information on a beacon frame or a short beacon frame used for sub 1 GHz band or IEEE 802.11ah. In this case, the beacon fame corresponds to one of management frames in sub 1 GHz band or IEEE 802.11ah and is periodically transmitted to indicate the existence of a wireless network and make a scanning performing device search for the wireless network and participate in the wireless network. In particular, when NAN devices use sub 1 GHz band or IEEE 802.11ah, since it is necessary to periodically transmit a beacon frame or a short beacon frame, it is necessary to provide information on the beacon frame in advance. In this case, the information can be shared in a manner of including the information in the IEEE 802.11ah capability field. In this case, referring to FIG. 11, a beacon frame or a short beacon frame can include various information based on a plurality of fields and can be configured as FIG. 11 (a) or FIG. 11 (b). Regarding the beacon frame or the short beacon frame, it may refer to the contents disclosed in IEEE 802.11ah standard document.

And, for example, a plurality of devices may exist in sub 1 GHz band or IEEE 802.11ah. In this case, for example, in sub 1 GHz band or IEEE 802.11ah, the total AID space is divided into a plurality of page groups, a page group is divided into a plurality of blocks, and a block can be divided into a plurality of sub-blocks. In this case, for example, when NAN devices use sub 1 GHz band or IEEE 802.11ah, since other devices may coexist with the NAN devices, it is necessary to know information on an index for a page group and an offset value in advance. In this case, the information can be shared in a manner of including the information in the IEEE 802.11ah capability field.

Besides, when the NAN devices use sub 1 GHz band or IEEE 802.11ah, necessary information can be included in the IEEE 802.11ah capability field in advance. And, other information can also be included using a reserved bit, by which the present invention may be non-limited.

In particular, when NAN devices support sub 1 GHz band or IEEE 802.11ah, the NAN devices can share information related to the support of sub 1 GHz band or IEEE 802.11ah with each other by including the information in a service discovery frame. By doing so, the NAN devices can share and use information on the connection of sub 1 GHz band or IEEE 802.11ah.

TABLE 11

| Field | Size (octets) | Value | Description |
|---|---|---|---|
| Length | 2 | 2 | Indicates length of IEEE 802.11ah Capability |
| Short Beacon Frame | Variable | Variable | It is necessary to provide short beacon frame defined in IEEE 802.11ah Draft 4.0. |
| Page Index | 1 | 1 | Indicates Page index. 3 step-TIM is defined to define many devices in IEEE 802.11ah. Pages: 2048 devices can be defined in a page. Blocks: 64 devices are defined in a block and 32 blocks are defined in a page. 8 Sub-blocks: 1 octet can express 8 devices and 8 sub-blocks are defined in a block. |
| Page Offset | | | Indicates offset at which page starts. |
| Encoded TIM Bitmap | | | Indicates TIM bitmap of device using IEEE 802.11ah. |
| Supported Data rates | | | Indicates data rate supported by IEEE 802.11ah Sub 1 GHz bands. |
| Reserved | | | It is able to additionally define field to be included to support IEEE 802.11ah. |

As a more specific method, referring to FIG. 10, a first NAN device 1010 can exchange a subscribe message with a second NAN device 1020. In this case, for example, the subscribe message may correspond to a NAN service discovery protocol message. For example, if a service/application end of the second NAN device calls a subscribe method via a service interface, an instance of a subscribe function can be generated. In this case, the second NAN device 1020 can transmit a subscribe message including the instance to the first NAN device 1010 via a NAN discovery engine. In this case, a service/application end of the first NAN device 1010 can also generate an instance of a subscribe function by calling a subscribe method via a service interface. Subsequently, the first NAN device 1010 can transmit a subscribe message including the instance to the second NAN device 1020. The second NAN device 1020 can forward a search result to the service/application end via a discovery result event. For example, if a prescribed condition is satisfied based on the discovery result, the second NAN device 1020 can transmit a publish message to the first NAN device 1010 via the subscribe message. In this case, the publish message may correspond to a NAN service discovery protocol as well. Subsequently, the first NAN device 1010 can also forward a search result to the service/application end via a discovery result event. Subsequently, the service/application end of the first NAN device 1010 can call a publish method via a service interface. Subsequently, the first NAN device 1010 can transmit a NAN service discovery frame to the second NAN device 1020.

In this case, for example, as mentioned in the foregoing description, the NAN service discovery frame can include a NAN connection capability attribute field. In this case, the NAN connection capability attribute field can include Sub 1 GHz band or IEEE 802.11ah information field. In this case, the Sub 1 GHz band or IEEE 802.11ah information field can indicate whether or not the first NAN device 1010 supports Sub 1 GHz band or IEEE 802.11ah. In this case, for example, if the Sub 1 GHz band or IEEE 802.11ah information field is set to a first value, it may indicate that the first NAN device 1010 supports Sub 1 GHz band or IEEE 802.11ah. If the Sub 1 GHz band or IEEE 802.11ah information field is set to a second value, it may indicate that the first NAN device 1010 does not support Sub 1 GHz band or IEEE 802.11ah.

In this case, for example, referring to FIG. 10, the first NAN device 1010 can transmit the NAN service discovery frame of which the Sub 1 GHz band or IEEE 802.11ah information field is set to the first value to the second NAN device 1020. In particular, the first NAN device 1010 includes information indicating that the first NAN device 1010 supports Sub 1 GHz band or IEEE 802.11ah in the service discovery frame and can transmit the service discovery frame to the second NAN device 1020.

And, for example, the service discovery frame can include Sub 1 GHz band or IEEE 802.11ah attribute field. In this case, for example, the Sub 1 GHz band or IEEE 802.11ah attribute field can include at least one selected from the group consisting of AID (association ID) information on the first NAN device 1010, information supporting Sub 1 GHz band or IEEE 802.11ah, information on available channel, and information on a time period. In particular, when the first NAN device 1010 uses Sub 1 GHz band or IEEE 802.11ah, necessary information can be included in the Sub 1 GHz band or IEEE 802.11ah attribute field.

In particular, the service discovery frame can include information indicating whether or not Sub 1 GHz band or IEEE 802.11ah is supported and related information.

In this case, for example, the second NAN device 1020 can also transmit the NAN service discovery frame to the first NAN device 1010. In this case, the NAN service discovery frame can include a NAN connection capability attribute field. And, the NAN connection capability attribute field can include Sub 1 GHz band or IEEE 802.11ah information field. In this case, the Sub 1 GHz band or IEEE 802.11ah information field can indicate whether or not the second NAN device 1020 supports Sub 1 GHz band or IEEE 802.11ah. In this case, for example, if the Sub 1 GHz band or IEEE 802.11ah information field is set to a first value, it may indicate that the second NAN device 1020 supports Sub 1 GHz band or IEEE 802.11ah. If the Sub 1 GHz band or IEEE 802.11ah information field is set to a second value, it may indicate that the second NAN device 1020 does not support Sub 1 GHz band or IEEE 802.11ah.

In this case, for example, referring to FIG. 10, the second NAN device 1020 can transmit the NAN service discovery frame of which the Sub 1 GHz band or IEEE 802.11ah information field is set to the first value to the first NAN device 1010. In particular, the second NAN device 1020 includes information indicating that the second NAN device 1020 supports Sub 1 GHz band or IEEE 802.11ah in the service discovery frame and can transmit the service discovery frame to the first NAN device 1010.

And, for example, the service discovery frame can include Sub 1 GHz band or IEEE 802.11ah attribute field. In this case, for example, the Sub 1 GHz band or IEEE 802.11ah attribute field can include at least one selected from the group consisting of AID (association ID) information on the second NAN device 1020, information supporting Sub 1 GHz band or IEEE 802.11ah, information on available channel, and information on a time period. In particular, when the second NAN device 1020 uses Sub 1 GHz band or IEEE 802.11ah, necessary information can be included in the Sub 1 GHz band or IEEE 802.11ah attribute field.

In particular, the service discovery frame can include information indicating whether or not Sub 1 GHz band or IEEE 802.11ah is supported and related information.

If the service discovery frame indicating that the first NAN device 1010 supports Sub 1 GHz band or IEEE 802.11ah is received from the second NAN device 1020, the first NAN device 1010 can forward a connection result event to the service/application end. By doing so, the first NAN device 1010 can exchange information on whether or not Sub 1 GHz band or IEEE 802.11ah is supported and related information with the second NAN device 1020.

After the information on Sub 1 GHz band or IEEE 802.11ah is exchanged between the first NAN device 1010 and the second NAN device 1020, data exchange can be performed using Sub 1 GHz band or IEEE 802.11ah. For example, since information on a time period or a channel used for the data exchange is exchanged between the first NAN device 1010 and the second NAN device 1020 via the service discovery frame, the first NAN device 1010 and the second NAN device 1020 are able to know the information before the data exchange is performed. By doing so, the NAN devices can use Sub 1 GHz band or IEEE 802.11ah.

Figure 12:
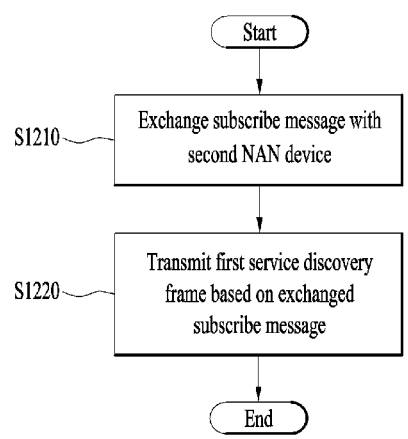
FIG. 12 is a flowchart for a method of performing service discovery.

FIG. 12 is a flowchart for a method of performing service discovery.

A first NAN device and a second NAN device can exchange a subscribe message [S1210]. In this case, as mentioned earlier in FIGS. 10 to 12, the subscribe message may correspond to a NAN service discovery protocol. In this case, as mentioned in the foregoing description, if a service/application end of the second NAN device calls a subscribe method via a service interface, an instance of a subscribe function can be generated. In this case, the second NAN device can transmit a subscribe message in which the instance is included to the first NAN device via a NAN discovery engine. In this case, a service/application end of the first NAN device can also generate an instance of a subscribe function by calling a subscribe method via a service interface. Subsequently, the first NAN device can transmit a subscribe message in which the instance is included to the second NAN device. By doing so, the first NAN device can exchange the subscribe message with the second NAN device.

Subsequently, the first NAN device can transmit a first service discovery frame to the second NAN device based on the subscribe message exchanged between the first NAN device and the second NAN device [S1220]. In this case, as mentioned earlier in FIGS. 10 to 12, the first service discovery frame can include information indicating whether or not Sub 1 GHz band or IEEE 802.11ah is supported. More specifically, a field indicating whether or not Sub 1 GHz band or IEEE 802.11ah is supported can be included in a NAN connection capability attribute field of the first service discovery frame. By doing so, it may be able to indicate whether or not the first NAN device supports Sub 1 GHz band or IEEE 802.11ah. And, as mentioned in the foregoing description, when the first NAN device supports Sub 1 GHz band or IEEE 802.11ah, Sub 1 GHz band or IEEE 802.11ah attribute field can be transmitted in a manner of being included in the first service discovery frame. In this case, as mentioned in the foregoing description, the Sub 1 GHz band or IEEE 802.11ah attribute field may correspond to information on Sub 1 GHz band or IEEE 802.11ah.

Subsequently, the first NAN device can receive a second service discovery frame from the second NAN device. In this case, as mentioned in the foregoing description, the second service discovery frame can include information indicating whether or not the second NAN device supports Sub 1 GHz band or IEEE 802.11ah and related information.

Figure 13:
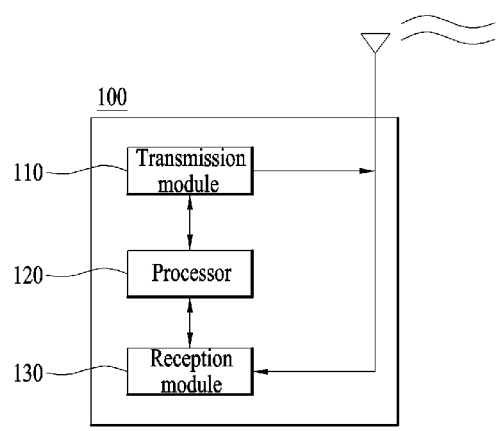
FIG. 13 is a block diagram for a device.

FIG. 13 is a block diagram for a device.

A device may correspond to a NAN device included in a cluster. In this case, as mentioned in the foregoing description, the device can transmit a service discovery frame to a different device to perform service discovery.

In this case, the device 100 can include a transmission module 110 configured to transmit a radio signal, a reception module 130 configured to receive a radio signal, and a processor 120 configured to control the transmission module 110 and the reception module 130. In this case, the device 100 can perform communication with an external device using the transmission module 110 and the reception module 130. In this case, the external device may correspond to a different device. And, the external device may correspond to a base station. In particular, the external device may correspond to a device capable of performing communication with the device 100, by which the present invention may be non-limited. The device 100 can transmit and receive digital data such as contents using the transmission module 110 and the reception module 130. And, the device 100 can exchange a beacon frame, a service discovery frame, and the like using the transmission module 110 and the reception module 130, by which the present invention may be non-limited. In particular, the device 100 performs communication using the transmission module 110 and the reception module 130 and may be able to exchange information with an external device.

According to one embodiment of the present specification, the device 100 can perform service discovery. In this case, the processor 120 can exchange a subscribe message with a different NAN device. In this case, if a prescribed condition is satisfied based on the exchanged subscribe message, the processor 120 can transmit a service discovery frame to a different NAN device. In this case, the service discovery frame can include a NAN connection capability attribute field. The NAN connection capability attribute field can include a first type interface information field. In this case, as mentioned in the foregoing description, the first type interface information field may correspond to a field indicating whether or not the first NAN device supports a first type interface.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

And, both an apparatus invention and a method invention are explained in the present specification and the explanation on both of the inventions can be complementally applied, if necessary

INDUSTRIAL APPLICABILITY

Although the present invention is explained under the assumption that the present invention is applied to a NAN wireless communication system, by which the present invention may be non-limited. The present invention can be applied to various wireless systems using the same scheme.

What is claimed is:
1. A method of performing service discovery performed by a first NAN (neighbor awareness networking) device in a wireless communication system, the method comprising:
exchanging a subscribe message with a second NAN device; and
transmitting a first service discovery frame (SDF) based on the exchanged subscribe message,
wherein the first service discovery frame comprises a NAN connection capability attribute field,
wherein the NAN connection capability attribute field comprises a first type interface information field indicating whether the first NAN device supports a first type interface, and wherein the NAN connection capability attribute field further comprises a beacon frame field containing information about a beacon frame associated with the first type interface.

2. The method of claim 1, wherein the first NAN device supports the first type interface when the first type interface information field is set to a first value, and
wherein the first NAN device does not support the first type interface when a second type interface information field is set to a second value.

3. The method of claim 2, wherein the first service discovery frame further comprises a first type interface attribute field when the first type interface information field is set to the first value.

4. The method of claim 3, wherein the first type interface attribute field comprises at least one selected from the group consisting of ID information on the first type interface, information supporting the first type interface, and information on an available channel and a time period.

5. The method of claim 1, wherein the first type interface corresponds to an interface using a first frequency band.

6. The method of claim 5, wherein the first frequency band corresponds to Sub 1 GHz band.

7. The method of claim 1, further comprising:
receiving a second service discovery frame from the second NAN device,
wherein the second service discovery frame comprises information indicating whether or not the second NAN device supports the first type interface.

8. The method of claim 7, wherein data exchange is performed with the second NAN device based on the first type interface when the second NAN device supports the first type interface based on the second service discovery frame.

9. A first NAN (neighbor awareness networking) device performing service discovery in a wireless communication system, comprising:
a reception module configured to receive information from an external device;
a transmission module configured to transmit information to an external device; and
a processor configured to control the reception module and the transmission module, wherein the processor is further configured to:
exchange a subscribe message with a second NAN device,
transmit a first service discovery frame (SDF) based on the exchanged subscribe message,
wherein the first service discovery frame comprises a NAN connection capability attribute field,
wherein the NAN connection capability attribute field comprises a first type interface information field indicating whether the first NAN device supports a first type interface, and
wherein the NAN connection capability attribute field further comprises a beacon frame field containing information about a beacon frame associated with the first type interface.

10. The first NAN device of claim 9, wherein the first NAN device supports the first type interface when the first type interface information field is set to a first value, and
wherein the first NAN device does not support the first type interface when a second type interface information field is set to a second value.

11. The first NAN device of claim 10, wherein the first service discovery frame comprises first type interface attribute information when the first type interface information field is set to the first value.

12. The first NAN device of claim 11, wherein the first type interface attribute field comprises at least one selected from the group consisting of ID information on the first type interface, information supporting the first type interface, and information on an available channel and a time period.

13. The first NAN device of claim 9, wherein the first type interface corresponds to an interface using a first frequency band.

14. The first NAN device of claim 13, wherein the first frequency band corresponds to Sub 1 GHz band.

15. The first NAN device of claim 9, wherein the processor is further configured to receive a second service discovery frame from the second NAN device,
wherein the second service discovery frame comprises information indicating whether or not the second NAN device supports the first type interface, and
wherein data exchange is performed with the second NAN device based on the first type interface when the second NAN device supports the first type interface based on the second service discovery frame.

* * * * *